(12) United States Patent
Nguyen et al.

(10) Patent No.: US 12,177,043 B2
(45) Date of Patent: Dec. 24, 2024

(54) PILOT-LESS CHANNEL ESTIMATION AND EVALUATION FOR LOS-MIMO MICROWAVE RADIO LINKS

(71) Applicant: Telefonaktiebolaget LM Ericsson (publ), Stockholm (SE)

(72) Inventors: Sinh Nguyen, Gothenburg (SE); Cristian Czegledi, Gothenburg (SE); Lei Bao, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 4 days.

(21) Appl. No.: 18/039,866

(22) PCT Filed: Dec. 3, 2020

(86) PCT No.: PCT/EP2020/084486
§ 371 (c)(1),
(2) Date: Jun. 1, 2023

(87) PCT Pub. No.: WO2022/117194
PCT Pub. Date: Jun. 9, 2022

(65) Prior Publication Data
US 2024/0048410 A1    Feb. 8, 2024

(51) Int. Cl.
*H04L 25/02*    (2006.01)
*H04B 7/0413*    (2017.01)

(52) U.S. Cl.
CPC ....... *H04L 25/0204* (2013.01); *H04B 7/0413* (2013.01)

(58) Field of Classification Search
CPC . H04L 25/0204; H04B 7/0413; H04B 7/0617; H04B 7/0854; H04B 7/0845
(Continued)

(56) References Cited

U.S. PATENT DOCUMENTS

| | | | |
|---|---|---|---|
| 9,882,661 B1 * | 1/2018 | Gross | H04B 17/21 |
| 9,948,347 B2 * | 4/2018 | Milenkovic | H04B 17/21 |

(Continued)

FOREIGN PATENT DOCUMENTS

WO    2012/167823 A1    12/2012

OTHER PUBLICATIONS

International Search Report and Written Opinion with Transmittal dated Aug. 13, 2021 issued in International Patent Application No. PCT/EP2020/084486 (14 pages).
(Continued)

*Primary Examiner* — Emmanuel Bayard
(74) *Attorney, Agent, or Firm* — Rothwell, Figg, Ernst & Manbeck, P.C.

(57) ABSTRACT

A computer-implemented method, performed in a network node, for estimating one or more relative channel gains and one or more channel phases associated with a wireless propagation channel (H) between N transmit antennas (220) and M receive antennas (230) in a line-of-sight, LOS, multiple-input multiple-output, MIMO, communication system (200), the method comprising configuring a channel equalizer to compensate for differences in complex gain over the wireless propagation channel (H) between the N transmit antennas (220) and the M receive antennas (230), configuring a phase tracker to compensate for differences in phase between a set of transmit side oscillators (240) at the N transmit antennas (220) and a set of receive side oscillators (250) at the M receive antennas (230), obtaining a set of equalizer coefficients (W) from the channel equalizer indicative of relative complex gain differences of propagation paths between the N transmit antennas (220) and the M receive antennas (230), obtaining a set of phase compensation values (E) from the phase tracker representing estimated phases of the set of transmit side oscillators and the set of
(Continued)

differences of propagation paths between the N transmit antennas (220) and the M receive antennas (230), obtaining a set of phase compensation values (E) from the phase tracker representing estimated phases of the set of transmit side oscillators and the set of receive side oscillators, and upon the channel equalizer meeting a convergence criterion, estimating the one or more relative channel gains and the one or more channel phases based on an inverse function of the set of equalizer coefficients (W) and the set of phase compensation values (E).

19 Claims, 5 Drawing Sheets

(58) Field of Classification Search
USPC .................................. 375/219, 267, 299, 354
See application file for complete search history.

(56) References Cited

U.S. PATENT DOCUMENTS

| | | | |
|---|---|---|---|
| 10,763,865 B1* | 9/2020 | Badizadegan | G06F 13/4291 |
| 10,931,362 B1* | 2/2021 | Bruzzone | H04B 17/12 |
| 2005/0047384 A1 | 3/2005 | Wax et al. | |
| 2014/0126613 A1* | 5/2014 | Zhang | H04L 7/033 |
| | | | 375/219 |
| 2015/0156036 A1 | 6/2015 | Genossar et al. | |
| 2016/0147703 A1* | 5/2016 | Park | G06F 13/14 |
| | | | 710/106 |
| 2019/0222406 A1* | 7/2019 | Wang | H04L 25/0224 |
| 2022/0190848 A1* | 6/2022 | Jiang | H03L 7/18 |

OTHER PUBLICATIONS

Farhang-Boroujeny, B., "Filter Bank Multicarrier Modulation: A Waveform Candidate for 5G and Beyond," Advances in Electrical Engineering, vol. 50, No. 5, Dec. 21, 2014, Article ID 482805, XP055321566, http://dx.doi.org/10.1155/2014/482805 (27 pages).
Mehrpouyan, H. et al., "Joint Estimation of Channel and Oscillator Phase Noise in MIMO Systems", IEEE Transactions on Signal Processing, vol. 60, No. 9, Sep. 2012 (18 pages).

* cited by examiner

PILOT-LESS CHANNEL ESTIMATION AND EVALUATION FOR LOS-MIMO MICROWAVE RADIO LINKS

CROSS REFERENCE TO RELATED APPLICATIONS

This application is a 35 U.S.C. § 371 National Stage of International Patent Application No. PCT/EP2020/084486, filed Dec. 3, 2020, designating the United States.

TECHNICAL FIELD

The present disclosure relates to methods for channel estimation, characterization, and system evaluation in line-of-sight (LOS) multiple-input multiple-output (MIMO) microwave radio links. There are disclosed methods as well as radio transceivers and control units for determining channel parameters associated with a wireless propagation channel between two multi-antenna radio transceivers.

BACKGROUND

Point-to-point microwave radio links provide stable high rate data communication links between two fixed locations. They are often used to provide backhaul for radio base stations of a cellular access network, such as the fourth generation (4G) and fifth generation (5G) access networks defined by the third generation partnership program (3GPP).

These types of point-to-point radio links normally operate over line-of-sight (LOS) propagation channels and may use dual polarization to improve spectral efficiency measured in terms of bits per second and Hertz, bps/Hz, by cross-polar interference cancellation (XPIC) techniques. To further improve spectral efficiency, multiple-input multiple-output (MIMO) techniques may be employed. However, due to the prevailing LOS propagation conditions, the antennas must be carefully positioned in dependence of link distance and carrier frequency to provide the necessary channel rank for MIMO operation. LOS-MIMO techniques for microwave radio links, including aspects of antenna geometry and channel rank, is for instance described in U.S. Pat. No. 7,948,444 B2. When the antenna placement is sub-optimal MIMO precoding methods can be used to mitigate the link throughput performance degradation.

It is often desired to characterize the MIMO propagation channel between transmitter antennas and receiver antennas in a LOS-MIMO system, e.g., to determine a suitable precoding scheme or to evaluate the geometry of a given antenna deployment. However, such characterization is complicated by the fact that significant amounts of phase noise is introduced by oscillators at the transmitter antennas and at the receiver antennas. Phase noise is discussed in, e.g., U.S. Pat. No. 9,479,269 B2, and also by Hani Mehrpouyan, Ali A. Nasir, Steven D. Blostein, Thomas Eriksson, George K. Karagiannidis, and Tommy Svensson, in "Joint Estimation of Channel and Oscillator Phase Noise in MIMO Systems", IEEE TRANSACTIONS ON SIGNAL PROCESSING, VOL. 60, NO. 9, SEPTEMBER 2012. However, despite the available literature on the topic, there is a continuing need for improved methods of LOS-MIMO channel characterization which are associated with low complexity and low signaling overhead.

SUMMARY

It is an object of the present disclosure to provide improved methods for LOS-MIMO channel estimation and characterization. This object is obtained by a computer-implemented method, performed in a network node, for estimating one or more relative channel gains $|\tilde{h}_{mn}|^2$ and one or more channel phases $\tilde{\phi}_{mn}^{\tilde{H}}$ associated with a wireless propagation channel between N transmit antennas and M receive antennas in a LOS-MIMO communication system. The method comprises configuring a channel equalizer to compensate for differences in complex gain over the wireless propagation channel between the N transmit antennas and the M receive antennas and configuring a phase tracker to compensate for differences in phase between a set of transmit side oscillators at the N transmit antennas and a set of receive side oscillators at the M receive antennas. The method also comprises obtaining a set of equalizer coefficients from the channel equalizer indicative of relative complex gain differences of propagation paths between the N transmit antennas and the M receive antennas and obtaining a set of phase compensation values from the phase tracker representing estimated phases of the set of transmit side oscillators and the set of receive side oscillators. Upon the channel equalizer meeting a convergence criterion, the method estimates the one or more relative channel gains $|\tilde{h}_{mn}|^2$ and the one or more channel phases $\tilde{\phi}_{mn}^{\tilde{H}}$ based on an inverse function $f(\cdot)^{-1}$ of the set of equalizer coefficients and the set of phase compensation values.

This way channel estimation can be performed in a robust and accurate manner. It is an advantage that the channel estimation is able to operate without transmission of known pilot symbols. It is a further advantage that the methods are able to cope with relatively large amounts of phase noise which is normally present in high carrier frequency microwave radio links. Thus, a method for channel characterization particularly suitable for LOS-MIMO systems is provided.

According to some aspects, the method comprises initially configuring the channel equalizer in a training phase mode of operation. This training phase provides a robust initial acquisition and paves the way for the pilot-less steady-state operation.

According to some other aspects, the method comprises configuring the channel equalizer as a single tap channel equalizer. This reduces computational complexity. For instance, the method may comprises obtaining the set of equalizer coefficients from the channel equalizer as one dominant tap value for each of a set of FIR filters.

According to further aspects, the method comprises tracking the one or more relative channel gains $|\tilde{h}_{mn}|^2$ and the one or more channel phases $\tilde{\phi}_{mn}^{\tilde{H}}$ over time, wherein the tracking comprises weighting newly estimated channel gains and channel phases in dependence of a phase error metric and/or an MSE metric value. By tracking the channel and accounting for phase error and/or other forms of detection error, such as MSE, the accuracy in the channel estimate can be improved, which is an advantage.

According to additional aspects, the method comprises configuring the phase tracker to estimate a separate phase value $[\tilde{\phi}_1^t, \tilde{\phi}_2^t, \ldots, \tilde{\phi}_N^t, \tilde{\phi}_1^r, \tilde{\phi}_2^r, \ldots, \tilde{\phi}_M^r]$ for each oscillator in the set of transmit side oscillators and for each oscillator in the set of receive side oscillators. By keeping track of separate phase values, it becomes easier to determine channel phase. Also, channel coding can be improved by taking different oscillator phase noise statistics into account.

According to yet further aspects, the method comprises configuring a set of LOS-MIMO pre-coding coefficients based on the one or more relative channel gains $|\tilde{h}_{mn}|^2$ and the one or more channel phases $\tilde{\phi}_{mn}^{\tilde{H}}$. Thus, MIMO operation can be improved.

According to aspects, the method comprises evaluating a LOS-MIMO deployment optimality criterion based on the one or more relative channel gains $|\tilde{h}_{mn}|^2$ and/or on the one or more channel phases $\tilde{\phi}_{mn}^H$. Thus, sub-optimal deployments can be identified and corrected, which is an advantage. For instance, a notification to a network management entity can be triggered if the optimality criterion fails to meet a pre-determined optimality specification. The channel estimate is also applicable in verification of link long-term availability as well as for gathering cross-polar interference statistics.

There are also disclosed herein transceivers, signal processing circuits and computer program products associated with the above-mentioned advantages.

BRIEF DESCRIPTION OF THE DRAWINGS

The present disclosure will now be described in more detail with reference to the appended drawings, where.

DETAILED DESCRIPTION

Figure 1:
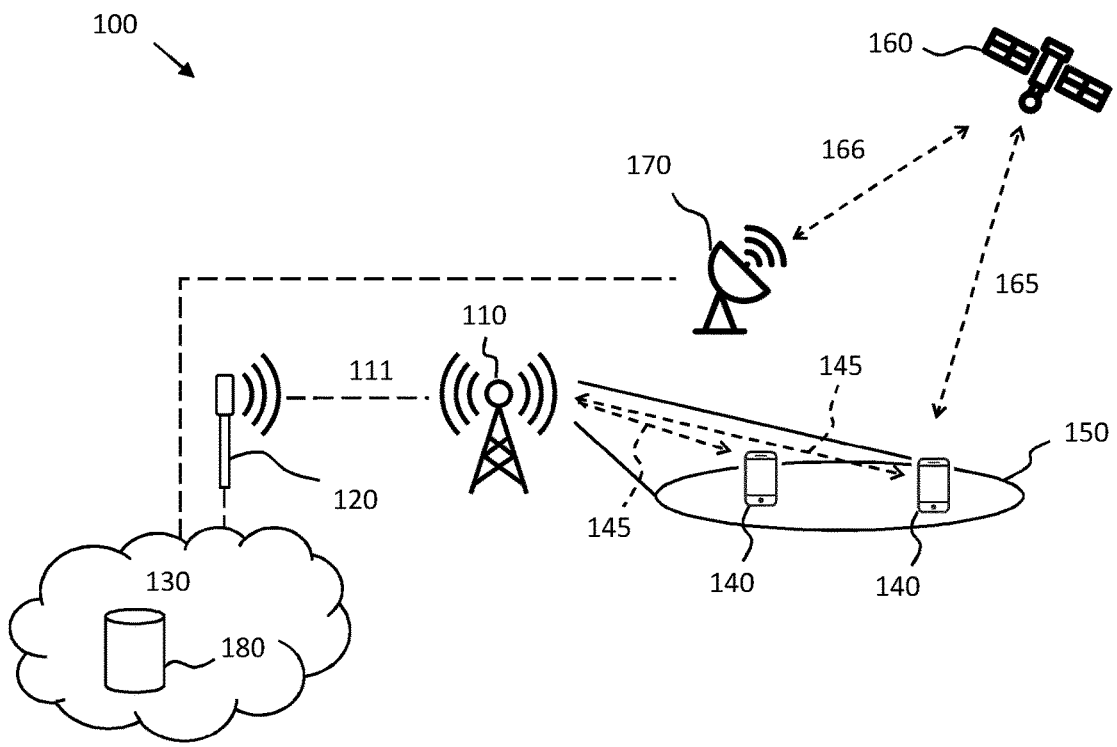
FIG. 1 schematically illustrates a communication network.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 illustrates an example communications network where the herein described techniques, software modules and devices can be used with advantage. A radio base station 110, such as an eNodeB or a gNodeB defined by the 3GPP for 4G and 5G cellular access networks, provides wireless access to a core network 130 over a coverage area 150. Wireless devices 140 connect to the radio base station 110 over wireless access links 145. The radio base station 110 is connected via microwave radio link 111 to a remote location transceiver 120. This radio link may comprise LOS-MIMO transceivers as discussed above. The core network 130 may, e.g., form part of an evolved packet core (EPC) network as defined by the 3GPP.

One or more satellite transceivers 160 may also communicate with wireless devices 140 over extra-terrestrial access links 165. The satellite transceiver 160 may be connected to the core network 130 via a ground station 170. The radio link 166 between the satellite transceiver 160 and the ground station 170 may also comprise LOS-MIMO transceivers as discussed above.

A network monitoring system 180 is connected to the core network 130. This network monitoring function keeps track of the network functions and overall network performance and may implement functions for detecting and mitigating error events, as well as for communication performance monitoring. For instance, the network monitoring function may keep track of the various radio link deployments in the network 100 and remotely configure parameters such as precoding vectors, modulations schemes, as well as filter bandwidths and the like for various tracking algorithms for use in LOS-MIMO systems. The network monitoring function may also control routing of data streams in the network to perform load balancing in dependence of current obtainable data rates on the different backhaul links in the network, and/or warn a network control unit about a potential radio link failure. This way the network control unit can prepare for a backhaul link failure, e.g., by allocating alternative backhaul communication resources, before the LOS-MIMO link actually goes down. The network monitoring function may also evaluate new radio link deployments to see if antenna geometries, i.e., inter-antenna spacing, can be improved, and if so dispatch technicians to adjust antenna geometry.

It is appreciated that LOS-MIMO microwave radio links may be used between almost any two types of wireless devices, even between two mobile wireless devices 140, although they are the most common between fixed location transceivers, such as point-to-point radio links for wireless backhaul applications. This is mainly because of the strict requirements on antenna geometry placed on LOS-MIMO systems in order to obtain the above-mentioned increase in spectral efficiency.

The following mathematical notation will the used throughout this disclosure:

H: an M×N complex-valued propagation channel matrix
N: number of transmit-side antennas
M: number of receive-side antennas
$s_n$: modulated information symbol at n-th TX antenna
$n_m$: thermal noise at m-th RX antenna
$r_m$: received information symbol at m-th RX antenna
$h_{mn}$: propagation channel coefficient between n-th TX and m-th RX antennas
$\phi_n^t$: phase noise realization at the n-th TX antenna
$\phi_m^r$: phase noise realization at the m-th RX antenna
$\phi_k = ([\phi_1^t, \phi_2^t, \ldots, \phi_N^t, \phi_1^r, \phi_2^r, \ldots, \phi_M^r])^T$ denotes the vector of phase noise realizations
$\tilde{\phi}_k$: phase tracker output
$h_{mn}^\Phi = h_{mn} e^{j(\phi_n^t + \phi_m^r)}$ are the instantaneous channel coefficients between n-th TX and m-th RX antennas in the presence of phase noises
W: M×N equalization matrix of complex equalizer gains
E: M×N phasor matrix of phase adjustments
$\hat{x}$ generally denotes an estimate of variable x, and $\tilde{x}$ denotes an approximative representation of variable x, potentially comprising biases and the like. Further, E* denotes element-wise complex conjugate of the elements in matrix E, $E^H$ denotes Hermitian transpose, and $E^T$ denotes matrix transpose. An M×N matrix, in general, has M rows and N columns. It is appreciated that the dimensions of the different matrices are dependent on implementation. The skilled person realizes that the definitions of matrix dimensions for a given implementation must be adjusted so as to match throughout, i.e., an N×M matrix always multiplies an M×N matrix (or a transposed N×M matrix) and so on.

Figure 2:
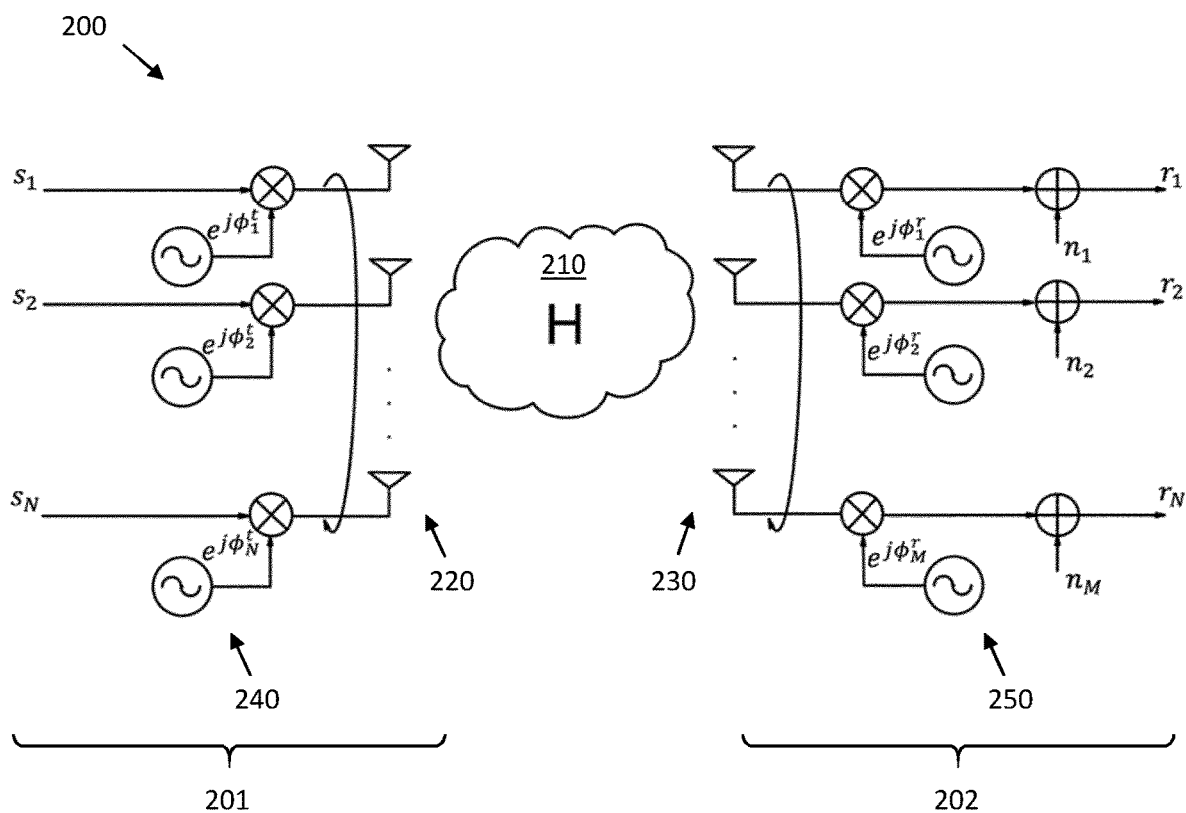
FIG. 2 shows an example LOS-MIMO communication system over a LOS channel H.

FIG. 2 illustrates an example LOS-MIMO radio link 200 comprising a transmitter 201 arranged to transmit a set of information symbols $\{s_1, s_2, \ldots, s_N\}$ to a receiver 202. The information symbols may be quadrature amplitude modulated (QAM) symbols or some other type of information symbol, such as information symbols in an orthogonal frequency division multiplexed (OFDM) system. The transmitter here comprises N separate transmit side oscillators 240 for converting the signal to be transmitted from baseband up to the transmission frequency band. For a microwave radio link, this transmission frequency band is normally above 28 GHz, such as the E-band which is located at about 80 GHz. Even higher carrier frequencies are also possible, such as 120 GHz and even bands up to about 300 GHz have been considered. It is normally very difficult to distribute such high frequency signal between spatially separated antennas 220, which is why independent oscillators, or oscillators sharing a lower frequency reference signal (which is easier to distribute due to the lower frequency) is used.

An ideal oscillator generates a pure sine wave. In the frequency domain, this would be represented as a single pair of Dirac delta functions (positive and negative conjugates) at the oscillator's frequency; i.e., all the signal's power is at a single frequency. However, all real-world oscillators have phase modulated noise components. The phase noise components spread the power of a signal to adjacent frequencies, resulting in noise sidebands. Oscillator phase noise often includes low frequency flicker noise and may include white noise.

Consider the following noise-free signal:

$$s(t) = A\cos(2\pi f t)$$

where A is its amplitude, f its phase, and t represents time. Phase noise is added to this signal by adding a stochastic process represented by $\phi(t)$ to the signal as follows:

$$s'(t) = A\cos(2\pi f t + \phi(t))$$

Phase noise is typically expressed in units of dBc/Hz, which represents the noise power relative to the carrier contained in a 1 Hz bandwidth centered at a certain offset from the carrier. For example, a certain signal may have a phase noise of −80 dBc/Hz at an offset of 10 kHz and −95 dBc/Hz at an offset of 100 kHz. Phase noise can be measured and expressed as single-sideband or double-sideband values, although such considerations have no effect on the present disclosure.

With reference again to FIG. 2, the phasor representing the n-th transmit side oscillator phase is denoted $e^{j\phi_n^t}$, where it is understood that the phase $\phi_n^t$ is a function of time although this dependency has been left out for increased readability.

The transmitted signal passes between the N transmit antennas 220 to the M receive antennas 230 over a LOS channel modelled by a complex channel matrix H 210. The channel, generally, applies a relatively slowly time-varying complex gain in-between any two antennas. This complex gain represents a change in amplitude as well as a change in phase. H is the complex-valued channel propagation matrix, which e.g. can be written as $$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

for 4×4 spatial (single-polarized) MIMO channel, or $$H = \begin{bmatrix} h_{11}^{VV} & h_{12}^{VV} & h_{11}^{VH} & h_{12}^{VH} \\ h_{21}^{VV} & h_{22}^{VV} & h_{21}^{VH} & h_{22}^{VH} \\ h_{11}^{HV} & h_{12}^{HV} & h_{11}^{HH} & h_{12}^{HH} \\ h_{21}^{HV} & h_{22}^{HV} & h_{21}^{HH} & h_{22}^{HH} \end{bmatrix}$$

for 4×4 spatial dual-polarized MIMO channel with vertical (V) and horizontal (H) polarization.

The received signal is down-converted in frequency to baseband using M receive side oscillators 250. The phasor representing the m-th receive side oscillator phase is denoted $e^{j\phi_m^r}$, where it is again understood that the phase $\phi_m^r$ is a function of time.

Note that some antennas on the transmit side and/or at the receive side may share a single oscillator, and some oscillators may share a reference frequency signal. Generally, the higher the frequency of the reference signal, the more correlated the phase noise processes at the two oscillators will be.

Additive noise $\{n_1, n_2, \ldots, n_M\}$ 260 is also added at the receiver. Consequently, the received signal at one of the receive side antenna branches is given by $$r_m = \sum_{n=1}^{N} h_{mn}^{\phi} s_n + n_m$$

where $n_m$ may at least resemble additive white Gaussian noise (AWGN)

Figure 3:
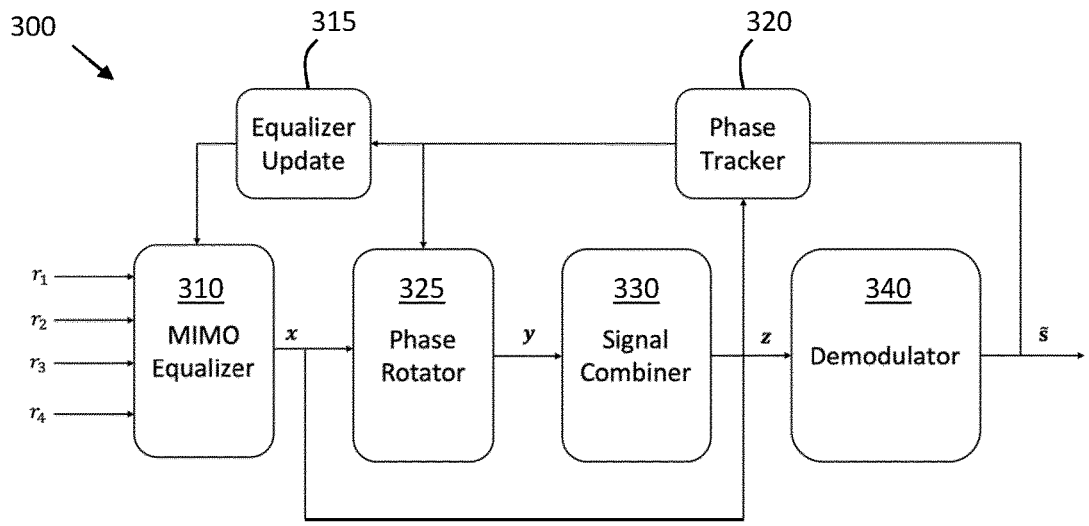
FIG. 3 is a block diagram illustrating a LOS-MIMO receiver.

FIG. 3 schematically illustrates the functions of an example LOS-MIMO receiver 300. A more detailed example will be discussed below in connection to FIG. 5. A MIMO equalizer 310 is first applied to compensate or the effects of the channel, H. Several different types of MIMO equalizers are known, e.g., least mean squared (LMS) trained equalizers, zero-forcing (ZF) equalizer, minimum-mean-squared-error (MMSE) equalizer, and so on. An LMS-trained equalizer based on an MN×1 vector of finite impulse response (FIR) filters, has coefficients $W_k = \text{vec}(W_k)$ at time k which are updated as $$w_k = w_{k-1} - \mu(1_M^T \otimes r_{k-1}) \odot [w^*_{k-1} \odot (1_M^T \otimes r_{k-1}) - 1_M^T \otimes \hat{s}_{k-1}]$$

where $\mu$ is a step size, $1_M^T$, is an M×1 vector of all ones, $\odot$ is element-wise multiplication, $\otimes$ denotes Kronecker product, $\hat{s}_{k-1}$ is the demodulated signals (i.e., estimates of the transmitted information symbols). In the training phase, the true transmitted signal $s_{k-1}$ can be used. Blind acquisition based on constant modulus or the like can also be used. MIMO equalizers are generally known and will therefore not be discussed in more detail herein. The update algorithm is executed in the equalizer update module 315.

The output x from the equalizer 310 in FIG. 3 is then fed to a phase rotator module 325 which applies a high bandwidth phase compensation to the received signal based on estimates of system phases determined by a phase tracking module 320. This is mainly done to compensate for the fast phase perturbation introduced by the transmit side and receive side oscillators discussed above.

Denoting $\phi_k = [\phi_1^t, \phi_2^t, \ldots, \phi_N^t, \phi_1^r, \phi_2^r, \ldots, \phi_M^r]^T$, and assuming that each individual phase noise process follows a Weiner process, the state-observation equations used for phase noise tracking by the phase tracker 320 can be written as $$\phi_k = \phi_{k-1} + \delta_k$$

where $\delta_k$ is a vector of additive noise, such as white Gaussian noise. The vector $\phi_k$ can be tracked using Bayesian-based filtering methods, such as a Kalman filter. Many other phase tracking methods are known in the literature, and phase tracking per se will therefore not be discussed in more detail herein.

Since the channel propagation phases are not known, the phase estimates from the phase tracker, e.g., the state variables of the Kalman filters, herein denoted by $$\hat{\phi}_k = [\hat{\phi}_1^t, \hat{\phi}_2^t, \ldots, \hat{\phi}_N^t, \hat{\phi}_1^r, \hat{\phi}_2^r, \ldots, \hat{\phi}_M^r]^T$$

are the estimates of the true phase states of the system with an unknown constant offset vector $$\Delta = [\Delta_1^t, \Delta_2^t, \ldots, \Delta_N^t, \Delta_1^r, \Delta_2^r, \ldots, \Delta_M^r]^T$$

i.e., $$\tilde{\phi}_k = \hat{\phi}_k + \Delta$$

In other words, the representation of oscillator phases $\tilde{\phi}_k$ is given by the estimate $\hat{\phi}_k$ and the potential bias vector $\Delta$. It is noted that the output of the phase tracker 320 is also used to update the equalizer coefficients. This is because the error signal $z_{k-1} - \hat{s}_{k-1}$, i.e., the difference between the input $z_{k-1}$ to the demodulator 340 and the estimated modulated information symbol $\hat{s}_{k-1}$ output from the demodulator 340, must be back-rotated to compensate for the phase rotation applied by the phase rotator 325. Thus, it is realized that a large detection error in phase may have a significant effect on the accuracy of the phase tracker, and also on the equalizer phase and gain compensation.

Figure 5:
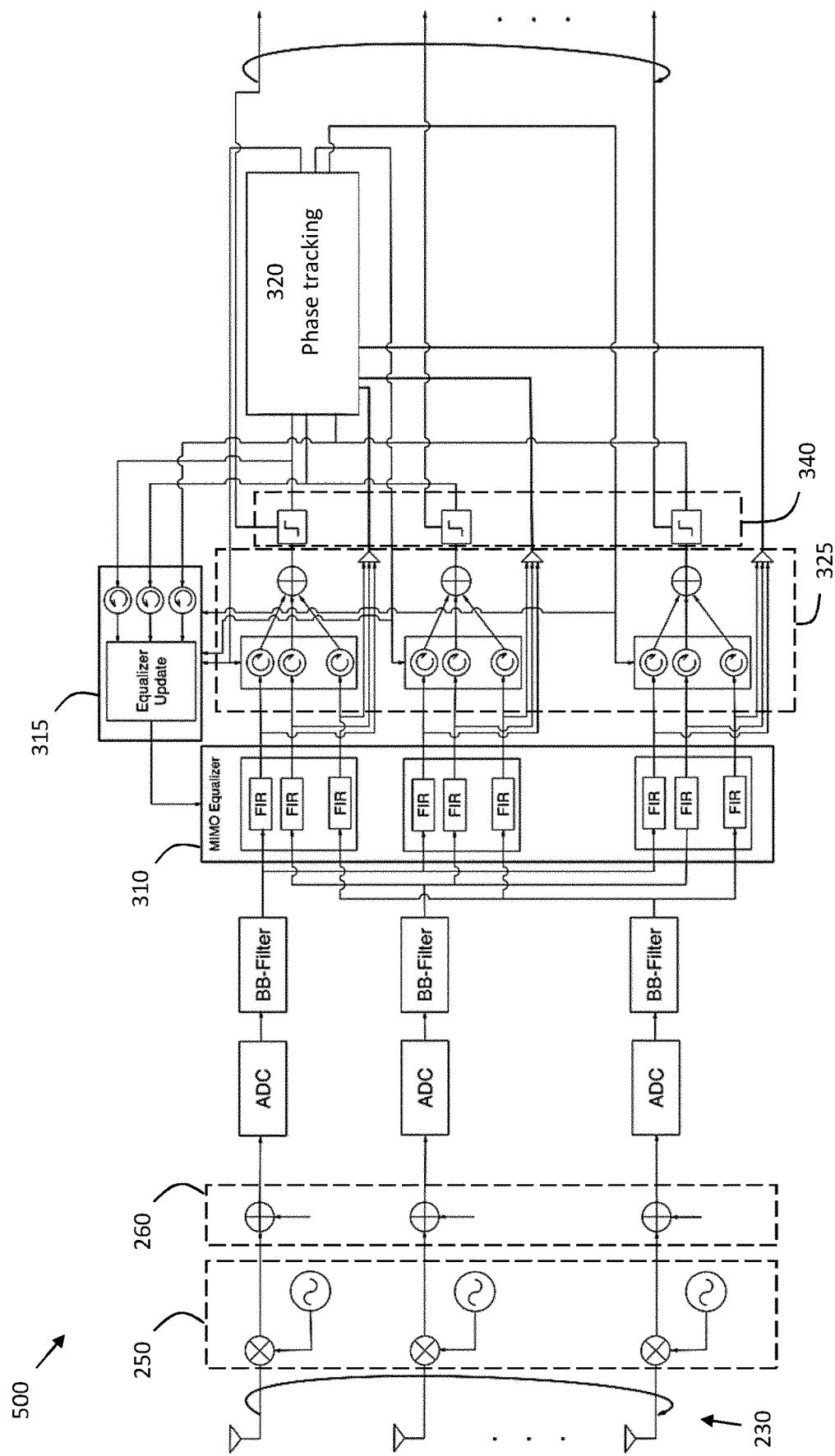
FIG. 5 is a block diagram schematically illustrating an example LOS-MIMO receiver.

The output y from the phase rotator 325 is then fed to a signal combiner 330 and then on to a demodulator 340 which generates estimates of the transmitted information symbols. According to an example, the demodulator performs an optimization over the transmission symbol alphabet $\mathbb{S}$ $$\hat{s}_k = \underset{s_k \in \mathbb{S}}{\operatorname{argmin}} |z_k - s_k|$$

where $\mathbb{S}$ is $2^Q$ possible transmitted information symbols, where Q is the modulation index. FIG. 5 shows a more detailed example of a LOS-MIMO receiver 500. The M signals received on the receive antenna branches are first samples by A/D converters (ADC) and then filtered by baseband (BB) filters. The filters signals are then input to the MIMO equalizer 310, the phase rotator 325 and the demodulator 340 in sequence. In this example, the MIMO equalizer comprises a collection of finite impulse response (FIR) filters.

After equalization, phase noise correction, and signal combination, the input to the demodulator 340 can be written as:

$$z_n = \Sigma_{m=1}^{M} (w_{mn} r_m) e^{-j\tilde{\phi}_{mn}^\Sigma}, \text{ for } n=1,2,\ldots,$$

where $\tilde{\phi}_{mn}^\Sigma = \tilde{\phi}_n^t + \tilde{\phi}_m^r$. The above equations can be written in a more compact form as $$z = (W \odot E^*)^T H^\Phi s + \tilde{n}$$

where $\odot$ denotes Hadamard product operator, E* denotes element-wise complex conjugate, and $\tilde{n} = [\tilde{n}_1, \tilde{n}_2, \ldots, \tilde{n}_N]^T$, $\tilde{n}_n = \Sigma_{m=1}^{M} w_{mn} n_n e^{-j\tilde{\phi}_{mn}^\Sigma}$.

Figure 4:
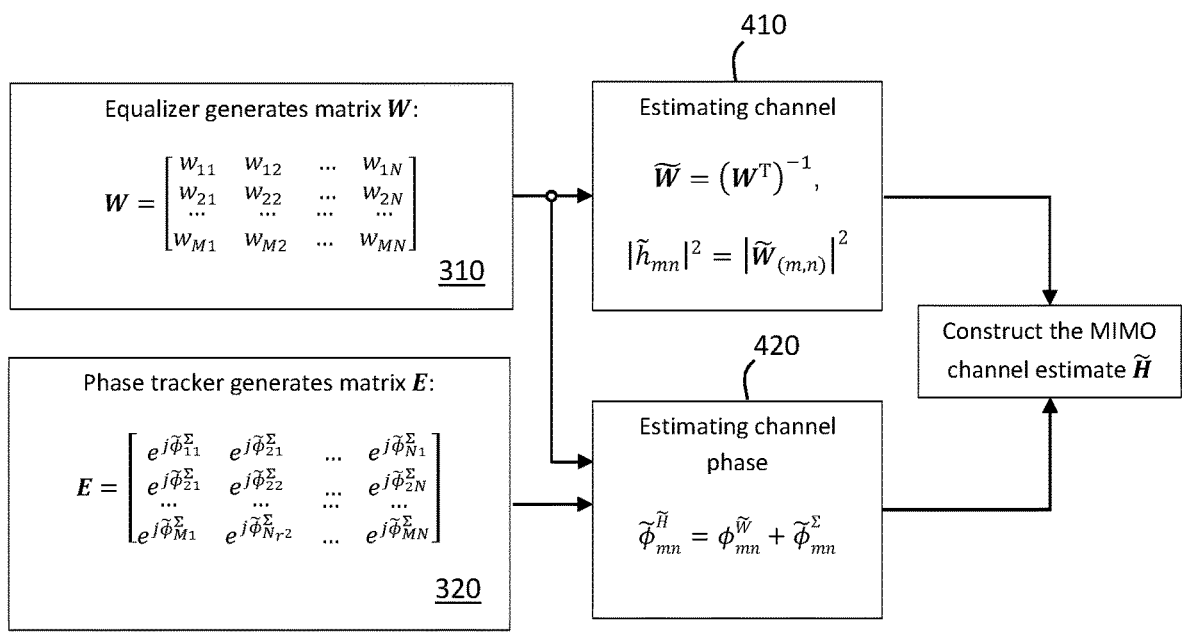
FIG. 4 is a block diagram illustrating methods for LOS-MIMO channel estimation.

With reference to FIG. 4, it is possible to estimate channel coefficients based on the complex weights W applied by the equalizer 310 and the phase tracker phase corrections E applied by the phase tracker 320.

When the equalizers converge, we have $$(W \odot E^*)^T H^\Phi = I_N$$

where $I_N$ denotes the N×N identity matrix.

The instantaneous channel matrix estimate can be reconstructed as $$\tilde{H} = \hat{H}^\Phi = (W^T \odot E^H)^{-1}$$

Let $\tilde{W} = (W^T)^{-1}$, instantaneous relative channel powers $|\tilde{h}_{mn}|^2$ can be calculated as $$|h_{mn}|^2 = |\tilde{h}_{mn}|^2 = |\tilde{H}_{(m,n)}|^2 = |\tilde{W}_{(m,n)}|^2$$

which is independent from hardware phase noise impairments. This is because, since $E^H = e_1 * e_2^T$ is rank-one ($e_1 = \exp([-j\tilde{\phi}_1^r, -j\tilde{\phi}_2^r, \ldots, -j\tilde{\phi}_N^r])$ and $e_2 = \exp([-j\tilde{\phi}_1^t, -j\tilde{\phi}_2^t, \ldots, -j\tilde{\phi}_M^t])$ are column vectors), $$W^T \odot E^H = W^T \odot (e_1 * e_2) = D_1 W^T D_2$$

where $D_1$ and $D_2$ are unit-amplitude diagonal matrices formed by elements of $e_1$ and $e_2$, respectively.

$$\tilde{H} = (W^T \odot E^H)^{-1} = D_2^{-1} (W^T)^{-1} D_1^{-1}$$

Also, let $\tilde{W} = (W^T)^{-1}$, the instantaneous channel phase $\tilde{\phi}_{mn}^H$ can be calculated by a MIMO channel phase estimator 420 as $$\tilde{\phi}_{mn}^H = \tilde{\phi}_{mn}^W + \tilde{\phi}_{mn}^\Sigma$$

where $\tilde{\phi}_{mn}^W$ is the phase of $\tilde{W}_{(m,n)}$.

Figure 6:
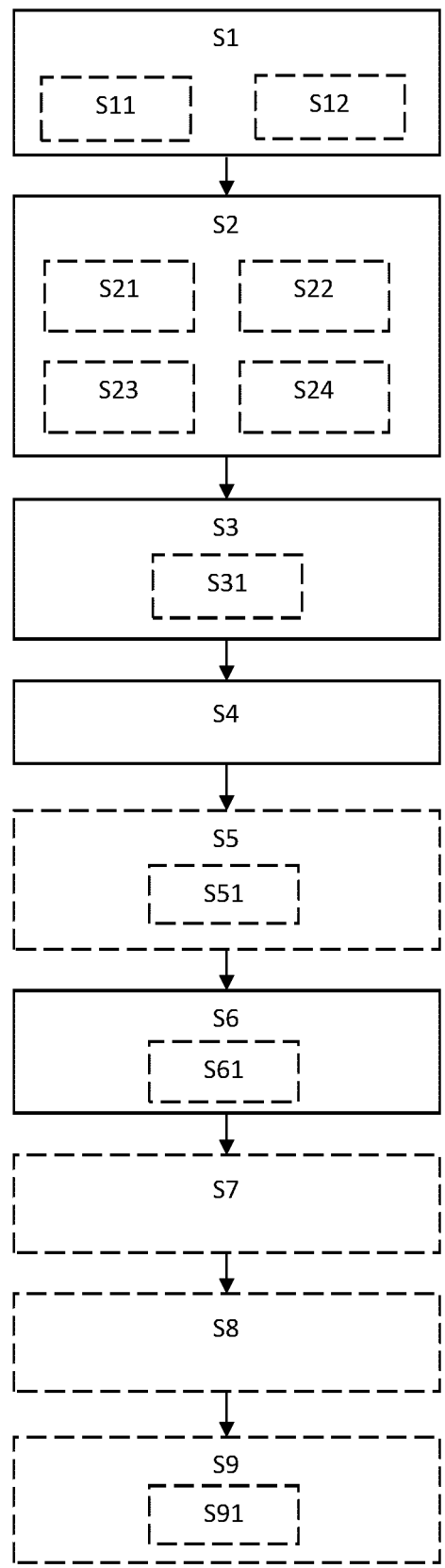
FIG. 6 is a flow chart illustrating methods.

FIG. 6 shows a flow chart illustrating methods which summarize at least some of the discussion above. There is illustrated a computer-implemented method, performed in a network node such as the network nodes discussed above in connection to FIG. 1, i.e., 110, 120, 130, 140, 160, 170, 180. The method is a method for estimating one or more relative channel gains $|\tilde{h}_{mn}|^2$ and one or more channel phases $\tilde{\phi}_{mn}^H$ associated with a wireless propagation channel H 210 between N transmit antennas 220 and M receive antennas 230 in a LOS-MIMO communication system 200. The method comprises configuring S1 a channel equalizer 310 to compensate for differences in complex gain over the wireless propagation channel H 210 between the N transmit antennas 220 and the M receive antennas 230. This equalizer may, e.g., by an LMS-type equalizer as mentioned above, but other types of equalizers are certainly possible to use. The method optionally comprises initially configuring S11 the channel equalizer 310 in a training phase mode of operation, where some form of known information symbols, i.e., pilot symbols or the like, are sent from the transmitter side to the receiver side. Alternatively, the equalizer may be initially configured in a blind acquisition mode of operation where equalizer tap update is performed based on, e.g., the constant modulus method. The method may also comprise configuring S12 the channel equalizer 310 as a single tap channel equalizer, although multi-tap equalizers are also possible, such as the FIR filter structure discussed in connection to FIG. 5 above.

The method also comprises configuring S2 a phase tracker 320 to compensate for differences in phase between the set of transmit side oscillators 240 at the N transmit antennas 220 and the set of receive side oscillators 250 at the M receive antennas 230. It is appreciated that a near-constant phase offset vector $$\Delta = ([\Delta_1^t, \Delta_2^t, \ldots, \Delta_N^t, \Delta_1^r, \Delta_2^r, \ldots, \Delta_M^r])^T$$

can be introduced by the equalizer and compensated for by the phase rotator 325. This is because both the equalizer and the phase rotator compensate for phase, albeit at different control bandwidths. Optionally, the method comprises configuring S21 the phase tracker 320 to estimate a separate phase value ($[\tilde{\phi}_1^t, \tilde{\phi}_2^t, \ldots, \tilde{\phi}_N^t, \tilde{\phi}_1^r, \tilde{\phi}_2^r, \ldots, \tilde{\phi}_M^r]^T$) for each oscillator in the set of transmit side oscillators 240 and for each oscillator in the set of receive side oscillators 250. As mentioned above, several different phase tracking methods are known in the literature, for instance, a Bayesian method can be used. Thus, the method may comprise configuring S22 the phase tracker 320 as a Kalman filter phase tracker, configuring S23 the phase tracker 320 as a minimum-mean-squared-error, MMSE, phase tracker, or configuring S24 the phase tracker 320 as a particle filter phase tracker.

The method further comprises obtaining S3 a set of equalizer coefficients W from the channel equalizer 310 indicative of relative complex gain differences of propagation paths between the N transmit antennas 220 and the M receive antennas 230, and also obtaining S4 a set of phase compensation values E from the phase tracker 320 representing estimated phases of the set of transmit side oscillators and the set of receive side oscillators. To reduce method complexity, the method may comprise obtaining S31 the set of equalizer coefficients W from the channel equalizer 310 as one dominant tap value for each of a set of FIR filters.

Then, upon the channel equalizer 310 meeting a convergence criterion S5, the method estimates S6 the one or more relative channel gains $|\tilde{h}_{mn}|^2$ and the one or more channel phases $\tilde{\phi}_{mn}^{\tilde{H}}$ based on an inverse function $f(\bullet)^{-1}$ of the set of equalizer coefficients W and the set of phase compensation values E as was discussed above. This can, for instance, be performed by estimating S61 the one or more relative channel gains $|\tilde{h}_{mn}|^2$ and the one or more channel phases $\tilde{\phi}_{mn}^{\tilde{H}}$ as $$\hat{H}^\Phi = (W^T \odot E^H)^{-1}$$

where $\hat{H}^\Phi$ is a matrix representing the channel gains and the channel phases, as discussed above.

Various convergence criteria can be adopted to determine when channel estimation based on the equalizer and phase tracker states can be performed with sufficient accuracy. For instance, the convergence criterion S51 may comprises any of an equalizer tap variation metric threshold, a receiver mean-squared-error (MSE) metric threshold, a gain error metric, a phase error metric, a bit-error rate, BER, metric threshold, and a packet-error-rate (PER), metric threshold.

The channel estimates can be refined by tracking the channel state over time. For instance, the method may comprise tracking S7 the one or more relative channel gains $|\tilde{h}_{mn}|^2$ and the one or more channel phases $\tilde{\phi}_{mn}^{\tilde{H}}$ over time, wherein the tracking comprises weighting newly estimated channel gains and channel phases in dependence of a phase error metric and/or an MSE metric value. These error metrics can be obtained from the demodulator function 340 in a known manner. Since the methods rely on equalizer and phase tracker states, i.e., estimates of optimal compensation functions W and E to account for gain and phase perturbations introduced by propagation over the channel H, including phase perturbation introduced by transmit-side and receive-side oscillators, it can be expected that the channel estimates will vary with the detection error. When transmissions conditions are good, the mean-squared error of detection is low, and both the equalizer and the phase tracker errors are small. In this case the channel estimate quality can also be expected to be high. However, when transmission conditions are worse, e.g., due to rain fading and the like, or due to bursts of higher-than-normal phase noise levels, then the channel estimate quality may deteriorate some. Thus, over time, the channel estimate can be improved by tracking and weighting in dependence of a phase error metric and/or an MSE metric value.

Several applications of the proposed MIMO channel estimation methods exist. For instance, the method may comprise configuring S8 a set of LOS-MIMO pre-coding coefficients based on the one or more relative channel gains $|\tilde{h}_{mn}|^2$ and the one or more channel phases $\tilde{\phi}_{mn}^{\tilde{H}}$. These pre-coding coefficients may, e.g., form part of a singular value decomposition (SVD) or the like. Such channel pre-coding approaches are known and will therefore not be discussed in more detail herein.

The method may furthermore comprise evaluating S9 a LOS-MIMO deployment optimality criterion based on the one or more relative channel gains $|\tilde{h}_{mn}|^2$ and/or on the one or more channel phases $\tilde{\phi}_{mn}^{\tilde{H}}$. It is appreciated that linear combinations of the estimated quantities can also be used with advantage, e.g., to evaluate deployment quality. In case a sub-optimality or a problem is detected based on the channel estimate, the method may comprise triggering S91 a notification to a network management entity if the optimality criterion fails to meet a pre-determined optimality specification. An example of a network management entity 180 was discussed above in connection to FIG. 1. For instance, the network management entity may trigger a work order to be sent to a service technician or a process to re-configure parameters of the radio link. The channel estimate is also useful for radio link verification of radio link long-term availability models, as well as for link-planning models and tools.

The optimality criterion may, e.g., comprise a channel matrix condition number, a phase variation, or the like.

Figure 7:
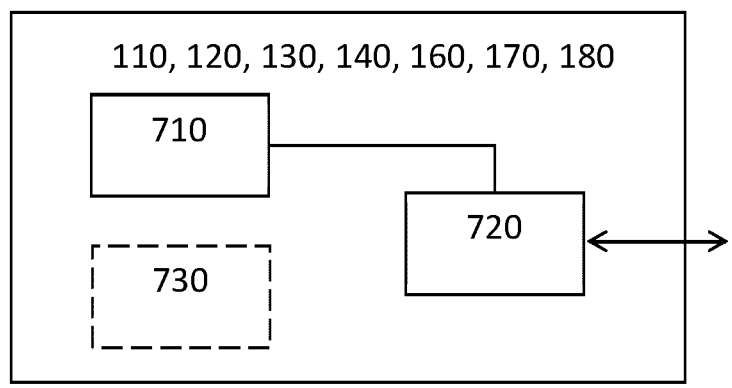
FIG. 7 schematically illustrates processing circuitry.

FIG. 7 schematically illustrates, in terms of a number of functional units, the general components of a network node 110, 120, 130, 140, 160, 170, 180 according to embodiments of the discussions herein. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the node to perform a set of operations, or steps, such as the methods discussed in connection to FIG. 6 and the discussions above. For example, the storage medium 730 may store the set of operations, and the processing circuitry 710 may be configured to retrieve the set of operations from the storage medium 730 to cause the device to perform the set of operations. The set of operations may be provided as a set of executable instructions. Thus, the processing circuitry 710 is thereby arranged to execute methods as herein disclosed. In other words, there is shown a network node 110, 120, 130, 140, 160, 170, 180 comprising processing circuitry 710, a network interface 720 coupled to the processing circuitry 710 and a memory 730 coupled to the processing circuitry 710, wherein the memory comprises machine readable computer program instructions that, when executed by the processing circuitry, causes the network node to transmit and to receive a radio frequency waveform over a propagation channel 111, 145, 165, 166.

The storage medium 730 may also comprise persistent storage, which, for example, can be any single one or combination of magnetic memory, optical memory, solid state memory or even remotely mounted memory.

The node 110, 120, 130, 140, 160, 170, 180 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the node 110, 120, 130, 140, 160, 170, 180, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

Thus, FIG. 7 schematically illustrates A network node 110, 120, 130, 140, 160, 170, 180, comprising processing circuitry 710, a network interface 720 coupled to the processing circuitry 710, and a memory 730 coupled to the processing circuitry 710, wherein the memory comprises machine readable computer program instructions that, when executed by the processing circuitry, causes the network node to perform a method as discussed above, e.g., in connection to FIG. 6.

Figure 8:
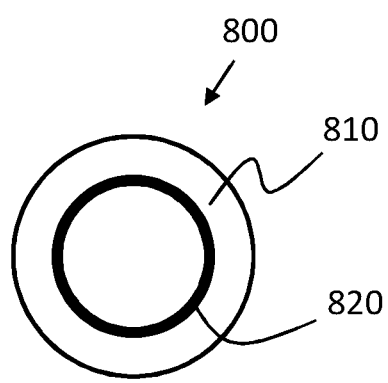
FIG. 8 shows a computer program product.

FIG. 8 illustrates a computer readable medium 810 carrying a computer program comprising program code means 820 for performing the methods illustrated in, e.g., FIG. 6, when said program product is run on a computer. The computer readable medium and the code means may together form a computer program product 800.

The invention claimed is:

1. A computer-implemented method, performed in a network node, for estimating one or more relative channel gains ($|\tilde{h}_{mn}|^2$) and one or more channel phases ($\tilde{\phi}_{mn}^{\tilde{H}}$) associated with a wireless propagation channel between N transmit antennas and M receive antennas in a line-of-sight (LOS) multiple-input multiple-output (MIMO) communication system, the method comprising:
configuring a channel equalizer to compensate for differences in complex gain over the wireless propagation channel between the N transmit antennas and the M receive antennas;
configuring a phase tracker to compensate for differences in phase between a set of transmit side oscillators at the N transmit antennas and a set of receive side oscillators at the M receive antennas;
obtaining a set of equalizer coefficients (W) from the channel equalizer indicative of relative complex gain differences of propagation paths between the N transmit antennas and the M receive antennas;
obtaining a set of phase compensation values (E) from the phase tracker representing estimated phases of the set of transmit side oscillators and the set of receive side oscillators; and
upon the channel equalizer meeting a convergence criterion, estimating the one or more relative channel gains ($|\tilde{h}_{mn}|^2$) and the one or more channel phases based on an inverse function ($f(\cdot)^{-1}$) of the set of equalizer coefficients (W) and the set of phase compensation values (E).

2. The method claim 1, comprising initially configuring the channel equalizer in a training phase mode of operation.

3. The method of claim 1, comprising configuring the channel equalizer as a single tap channel equalizer.

4. The method of claim 1, wherein the convergence criterion comprises any of an equalizer tap variation metric threshold, a receiver mean-squared-error metric threshold, a gain error metric, a phase error metric, a bit-error rate metric threshold, and a packet-error-rate metric threshold.

5. The method of claim 1, comprising obtaining the set of equalizer coefficients (W) from the channel equalizer as one dominant tap value for each of a set of finite impulse response filters.

6. The method of claim 1 comprising tracking the one or more relative channel gains ($|\tilde{h}_{mn}|^2$) and the one or more channel phases ($\tilde{\phi}_{mn}^{\tilde{H}}$) over time, wherein the tracking comprises weighting newly estimated channel gains and channel phases in dependence of a phase error metric and/or an MSE metric value.

7. The method of claim 1, comprising configuring the phase tracker to estimate a separate phase value ($[\tilde{\phi}_1^t, \tilde{\phi}_2^t, \ldots, \tilde{\phi}_N^t, \tilde{\phi}_1^r, \tilde{\phi}_2^r, \ldots, \tilde{\phi}_M^r]^T$) for each oscillator in the set of transmit side oscillators and for each oscillator in the set of receive side oscillators.

8. The method of claim 1, comprising configuring the phase tracker as a Kalman filter phase tracker.

9. The method of claim 1, comprising configuring the phase tracker as a minimum-mean-squared-error phase tracker.

10. The method of claim 1, comprising configuring the phase tracker as a particle filter phase tracker.

11. The method of claim 1, comprising estimating the one or more relative channel gains ($|\tilde{h}_{mn}|^2$) and the one or more channel phases ($\tilde{\phi}_{mn}^{\tilde{H}}$) as $$\hat{H}^\phi = (W^T \odot E^H)^{-1}$$

where $\hat{H}^\phi$ is a matrix representing the channel gains and the channel phases, W is a matrix representing the set of equalizer coefficients (W), E is a matrix representing the set of phase compensation values (E), and $\odot$ denotes element-wise product.

12. The method of claim 1, comprising configuring a set of LOS-MIMO pre-coding coefficients based on the one or more relative channel gains ($|\tilde{h}_{mn}|^2$) and the one or more channel phases ($\tilde{\phi}_{mn}^{\tilde{H}}$).

13. The method of claim 1, comprising evaluating a LOS-MIMO deployment optimality criterion based on the one or more relative channel gains ($|\tilde{h}_{mn}|^2$) and/or on the one or more channel phases ($\tilde{\phi}_{mn}^{\tilde{H}}$), or linear combinations thereof.

14. The method of claim 13, comprising triggering a notification to a network management entity if the optimality criterion fails to meet a pre-determined optimality specification.

15. A non-transitory computer readable storage medium storing a computer program comprising program code means for performing the method of claim 1 when the program is run on a computer or on processing circuitry of a network node.

16. A network node, comprising:
processing circuitry;
a network interface coupled to the processing circuitry; and
a memory coupled to the processing circuitry, wherein the memory comprises machine readable computer program instructions that, when executed by the processing circuitry, causes the network node to perform a method of claim 1.

17. The network node of claim 16, comprising a microwave transceiver arranged to operate at a carrier frequency above 28 GHz or at E-band.

18. The network node of claim 16, wherein the network node comprises a network monitoring function.

19. The network node of claim 16, wherein the network node comprises a satellite transceiver.

* * * * *